June 20, 1944.   W. L. BOND   2,352,072
CONOSCOPE
Filed Dec. 19, 1942   3 Sheets-Sheet 1
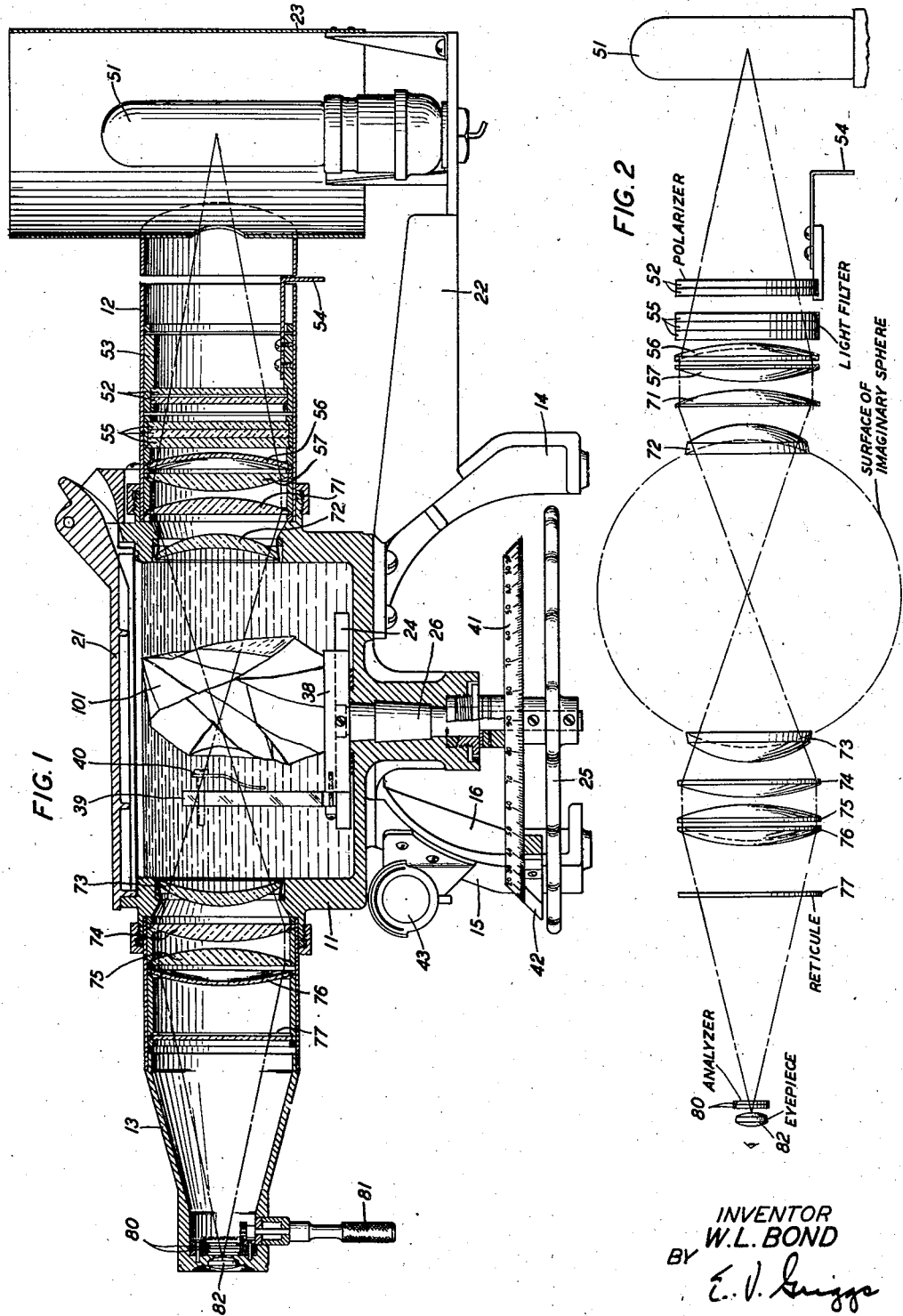
INVENTOR
W. L. BOND
BY E. V. Griggs
ATTORNEY June 20, 1944.  W. L. BOND  2,352,072
CONOSCOPE
Filed Dec. 19, 1942  3 Sheets-Sheet 2

INVENTOR
W. L. BOND
BY
E. V. Griggs
ATTORNEY

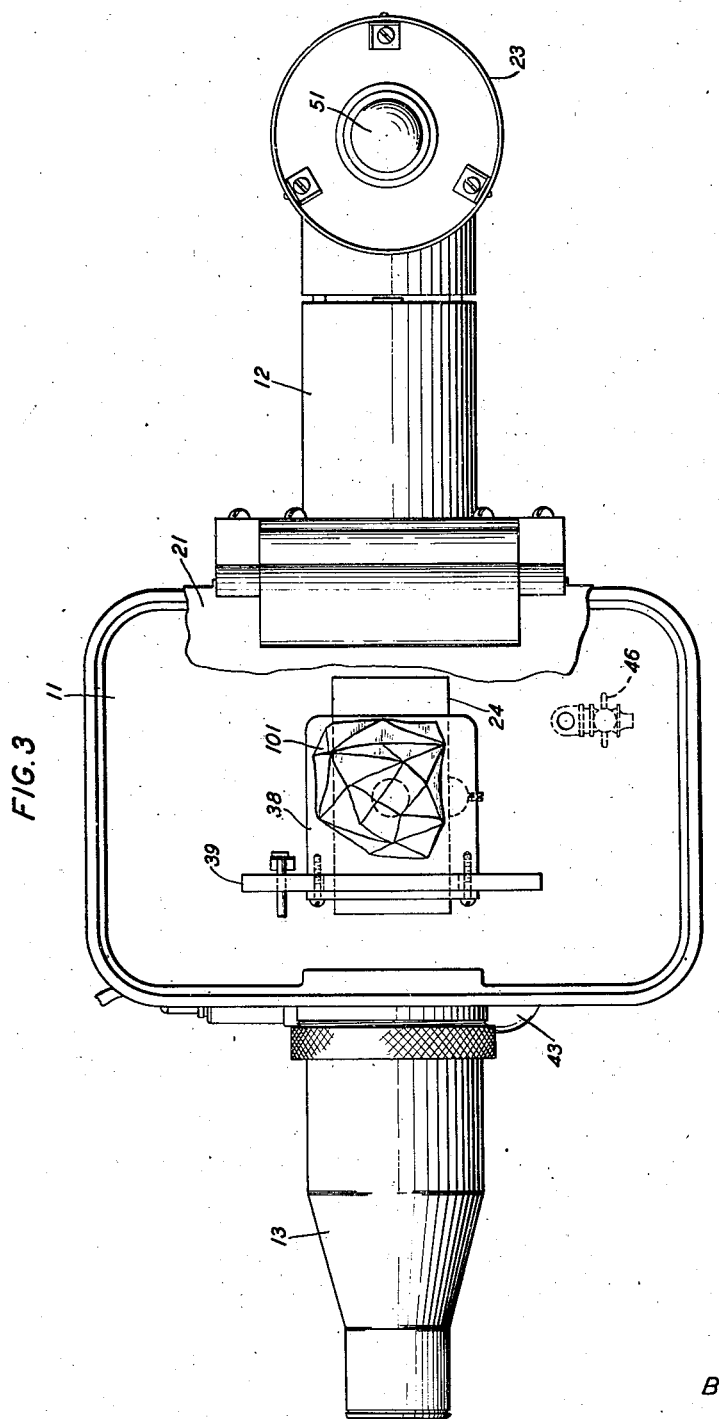

Patented June 20, 1944

2,352,072

UNITED STATES PATENT OFFICE 2,352,072

CONOSCOPE

Walter L. Bond, Brooklyn, N. Y., assignor to Bell Telephone Laboratories, Incorporated, New York, N. Y., a corporation of New York Application December 19, 1942, Serial No. 469,520

9 Claims. (Cl. 88—14)

This invention relates to a conoscope and more particularly to a conoscope of the immersion type.

An object of the invention is to facilitate the preparation and testing of crystals.

A more specific object of the invention is to facilitate the examination by means of polarized light of crystals of varying sizes and types.

In accordance with a specific embodiment of the invention a novel conoscope is provided which comprises an immersion tank, a rotatable work supporting platform within the tank and two optical systems which include, respectively, a light polarizer and an analyzer and which are arranged horizontally with respect to the tank. The crystal to be examined is positioned within the tank on the rotatable platform and is preferably immersed in a fluid which has the same, or approximately the same, index of refraction as the crystal being examined.

In accordance with a feature of the present invention the optical systems are arranged horizontally with respect to the tank whereby free and unobstructed access from above for filling the tank and for manipulating the crystal is assured.

In accordance with another feature of the invention the tank is free of traversing shafts and the like whereby relatively large crystals may be accommodated.

In accordance with still another feature of the invention the arrangement of the optical system is such that a "universal focus" is attained, that is, various fluids having different indices of refraction may be utilized without necessitating any change in lens settings. This is a particularly valuable feature as it facilitates the use of the conoscope for examination of different types of crystals, for example, quartz and Rochelle salt.

A complete understanding of the novel arrangement contemplated by the present invention as well as appreciation of the various valuable features thereof may be gained from consideration of the following detailed description and the annexed drawings in which:

Fig. 1 is a side elevational view of a conoscope which embodies features of the present invention, a portion of the conoscope being shown in section in order to illustrate certain parts more clearly;

Fig. 2 is a schematic representation of the arrangement and relative positioning of the lens systems utilized in the conoscope;

Fig. 3 is a top view of the conoscope illustrated in Fig. 1, the cover of the immersion tank being broken away to show the interior thereof;

Figure 4:
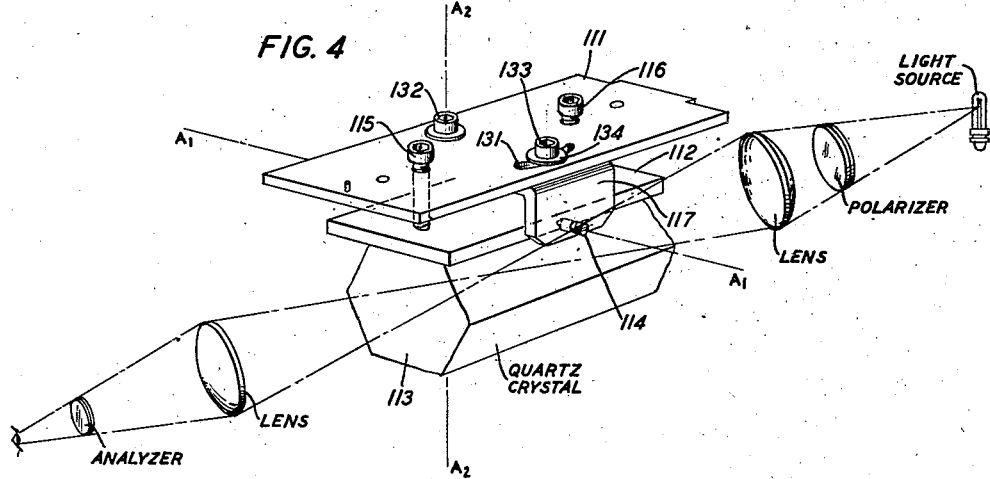
Fig. 4 is a perspective view of a fixture that may be used for adjustably supporting a crystal during examination by the conoscope.

Referring now to the drawings, the conoscope illustrated includes immersion tank 11, two lens tubes 12 and 13 arranged horizontally with respect to tank 11 and terminating in respective ports provided at diametrically opposite points in the wall thereof, and three supporting legs 14, 15 and 16 for supporting the conoscope assembly. Tank 11 is provided with cover 21 which is hinge supported to permit movement between closed and open positions. Supporting leg 14 carries horizontal extension arm 22 which supports lamp housing 23.

Platform 24 is rotatably supported inside tank 11; platform 24 may be rotated from the exterior of tank 11 by means of hand-wheel 25, the platform and hand-wheel being coupled through shaft 26. Suitable packing and bushings are provided to prevent leakage of fluid from tank 11 around shaft 26. Table 38 is removably supported on platform 24 and is rotatable therewith. Transparent end plate 39 is attached to table 38 and provides, in conjunction with spring clip 40, convenient means for supporting small and fragile objects being examined such as piezoelectric plates. The angular position of platform 24 within the tank may be determined by observing the relative positions of graduated dial 41 (rotatable with shaft 26) and fixed vernier 42. Lamp 43 is provided for illumination of the dial and vernier.

Valve 46 (Fig. 3) is provided in the base of tank 11 for drainage of liquid therefrom when desired.

Coming now to the optical and lens system, let us consider first the contents of lens tube 12, reference being made both to Fig. 1 and to Fig. 2. Starting at the end of tube 12 nearest to light source 51, which may be, for example, a lamp of the mercury vapor type, and moving toward tank 11, we first encounter light polarizer 52 which may comprise a polarizing film mounted between two plates of glass.

Polarizer 52 is mounted in carriage 53; carriage 53 and polarizer 52 may be rotated, within limits, inside tube 12 by means of lever 54 for a purpose that will be described subsequently.

The next element of the optical system encountered is light filter 55 which comprises three glass filter elements properly cut and polished; in the present example selected for disclosure filter 55 is arranged to isolate and transmit only "green" light so that when the optical system is illuminated by light source 51 only green light passes beyond light filter 55.

We next encounter, in order, concavo-convex lens 56, a pair of plano-convex lenses 57 and 71, arranged back to back, and concavo-convex lens 72.

In general, the functions of that portion of the optical system located in lens tube 12 are to polarize the light produced by source 51, to filter out all portions of the light except the green light and to cause the polarized green light to converge and to enter the crystal under examination in a cone of rays.

It will be noticed that concavo-convex lens 72 and similar concavo-convex lens 73 (of the optical system contained in lens tube 13 which will be described subsequently) are mounted in the two ports provided at diametrically opposite points in the wall of tank 11, the lenses acting as means for closing the respective ports to the passage of fluids. It should also be noted that the design of lenses 72 and 73 is such that the respective inner faces of the two lenses may be considered as being segments or lunes of a single imaginary sphere. This is clearly shown in Fig. 2, the surface of the imaginary sphere being indicated by the "dot-and-dash" circle. With this novel design of lenses, light rays projected from the center of the imaginary sphere will always strike the inner surface of the respective lens at right angles thereto regardless of the direction of the rays. As will be more apparent from subsequent portions of the description, this is a particularly valuable feature of the invention as it permits changing the make-up of the fluid in tank 11, with consequent change of the index of refraction, without necessitating any adjustment of the lens systems. In using the immersion type conoscope for examining crystals it is usual to fill the tank with a fluid which has an index of refraction substantially the same as that of the crystal being examined. This is done in order to prevent refraction of the beam of light by uneven surfaces of the crystal being examined; the index of refraction of the fluid should match that of the crystal in order that the light rays will not be bent in passing between fluid and crystal. Thus a different fluid, i. e., different with respect to refractive index, would preferably be utilized during examination of quartz crystals than that utilized during examination of Rochelle salt crystals; the novel arrangement of lenses referred to above permits ready change from one fluid to another as different crystalline materials are examined without necessitating any change in the optical system.

Considering now the portion of the optical system housed in lens tube 13, concavo-convex lens 73 has been referred to above. We next encounter, in order, a pair of plano-convex lenses 74 and 75, arranged back to back, and concavo-convex lens 76. The next element encountered is reticule 77, i. e., the "cross-hairs" element. The reticule may, for example, be a glass disc having fine lines scratched thereon at the desired points, these lines being filled with black pigment.

The next element of the optical system is analyzer 80 which may comprise a polarizing film mounted between glass plates. As shown in Fig. 1, analyzer 80 is mounted in a rotatable carriage which may be rotated, for a purpose to be described subsequently, by means of handle 81 which is coupled to the carriage by suitable gearing.

Eyepiece 82 is positioned at the end of lens tube 13.

The purpose, in general, of that portion of the optical system housed in lens tube 13 is to correct the divergence of the light rays so that the eye may focus them for the retina and to analyze the light rays.

As clearly shown in Fig. 2 both sets of lenses, i. e., the set positioned in lens tube 12 and the set positioned in lens tube 13, act to cause convergence of a diverging group of light rays.

The conoscope of the present invention may be used to advantage in making various types of observational tests on different crystalline materials. For example, it may be desirable to locate the so-called "Z" or optic axis of quartz piezoelectric crystal 101. To carry out a test for such purpose crystal 101 would be positioned on table 38, as shown in Fig. 1, and tank 11 filled with a suitable liquid, that is, one having an index of refraction the same as, or closely approximating, that of quartz. (Cover 21 may, as pointed out above, be opened to permit filling the tank and manipulating the crystal.) Among immersion liquids which applicant has found satisfactory for use during examination of quartz is a mixture of dimethyl phthalate and dichlor naphthalene in the approximate proportions (by weight) of 73.9 and 26.1, respectively.

It should be noted that in accordance with the novel arrangement of the present invention, tank 11 is entirely free of traversing shafts whereby relatively large crystals may be accommodated and whereby free access to the tank is provided for filling the tank and for manipulating the crystal.

Light from source 51, after polarization by polarizer 52 and after being filtered by light filter 55 so that only the green rays remain, is caused to converge by the lenses positioned in lens tube 12 and enters crystal 101 in a converging cone of light rays. The light rays, after passing through quartz crystal 101, pass through the correction lens system positioned in lens tube 13, through the reticule 77 which, as pointed out above, has "cross-hairs" marked thereon, and is then analyzed by analyzer 80.

Now it is known that if a ray of divergent or convergent plane polarized light be passed through a crystal parallel to the optic axis thereof and viewed by an analyzer, a system of concentric rings may be seen and that these rings occur only when the direction of the rays of light coincides with the optic axis of the crystal. The observer in the present instance, therefore, observes the light rays through eyepiece 82 and rotates hand-wheel 25 (and platform 24 and table 38 upon which crystal 101 is mounted) until the identifying system of concentric rings is seen. Upon occurrence of these rings he knows that crystal 101 is now in a position wherein its optic axis coincides with the direction of the rays of polarized light. Indication of the degree of rotation of platform 24 is given by scale 41.

The crystal may be tested in various other ways by the conoscope of the present invention; for example, it may be tested for the presence or absence of twinning. To facilitate certain of these tests and to make the conoscope more adaptable to examination of various different materials, polarizer 52 may be rotated within limits in lens tube 12 by lever 54 and analyzer 80 may be rotated in lens tube 13 by lever 81. The handedness of quartz crystal 101 may be determined by observing whether rotation of analyzer 80 results in expansion or contraction of the system of concentric rings referred to above.

The conoscope may be utilized also for testing finished quartz plates. In such case the finished plate, usually a relatively thin and fragile object, may be held in place against transparent end plate 39 by spring clip 40. Platform 24 is now rotated by hand-wheel 25 to the point at which the concentric ring system will be seen if the quartz plate has been cut at the proper angle. If the ring system is not visible, the amount of rotation of platform 24, as read on scale 41, required to bring in the concentric ring system will provide an indication of the magnitude of error present in the quartz plate being checked. The conoscope of the present invention is particularly well adapted to the examination of very thin plates in view of the provision of strongly convergent lenses.

The conoscope may, of course, be used for testing crystals other than quartz. For example, let us assume that a Rochelle salt crystal is to be tested. It would be placed on table 38, as was quartz plate 101, but the liquid provided in tank 11 for examination of the quartz crystal would now be replaced by a liquid having an index of refraction the same as, or closely approximating, that of Rochelle salt. Among immersion fluids which applicant believes satisfactory for use during examination of Rochelle salt is a mixture of decalin and alphamonochlornaphthalene in the approximate proportions (by volume) of 16 and 84, respectively. It should be noted that even though the immersion liquid having one particular index of refraction has been replaced by another liquid having an entirely different index of refraction, the novel arrangement of the optical system invented by applicant is such that no adjustment thereof is necessary. In particular, this is due to the novel design of concavo-convex lenses 72 and 73 whereby the respective inner surfaces are so related that they may be considered surfaces, or lunes, of the same imaginary sphere. By virtue of this novel arrangement, whereby the rays will always strike the inner surface of a respective one of the concavo-convex lenses at right angles thereto so long as they are projected to, or are coming from, the center point of the sphere and are not refracted during passage through the tank, the light rays, which are focused at the center of immersion tank 11 by lenses supported in lens tube 12, will pass through lens 72 perpendicularly to the inner surface thereof and will not be bent or refracted, therefore, as they contact the immersion liquid (or fluid) contained in the tank. (This follows from a fundamental law of optics, which states that if the incident ray is perpendicular to the surface separating the two media, the ray is not refracted.) The light rays pass through the center point of the tank and strike the inner surface of lens 73 perpendicularly thereto so here again there is no bending or refraction of the rays as they enter the lens. (The rays are not bent or refracted as they pass from the liquid into the crystal and from the crystal back into the liquid due to the fact that the liquid utilized is selected, as pointed out above, to have a refractive index the same, or substantially the same, as that of the crystal.) It is apparent, therefore, that the focus of the instrument is independent of the fluid contained in the tank and will not be changed even though one immersion liquid may be replaced by another having a different refractive index in order to match the index of a different type of crystal being examined. In fact the focus remains the same even if the tank contains only air. This fact adds to the practical usefulness of the conoscope, particularly in shops where crystals of various materials are being processed and tested.

Referring now to Fig. 4, there is illustrated a fixture which may be used to advantage in supporting a piezelectric crystal during examination in the conoscope described above and during subsequent sawing of the crystal plates. As shown, the fixture comprises a base plate 111 and a platform 112 tiltably and rotatably supported by base plate 111, the quartz crystal 113 which is to be examined and sawed being temporarily attached, for example by use of an adhesive, to the under-side of platform 112. Crystal 113 in this instance is assumed to be mounted with its Z or optic axis roughly parallel to the longer axis of base plate 111.

Platform 112 is tiltably supported with respect to base plate 111 by two pinion screws, pinion screw 114 and a similar pinion screw not shown but located diametrically opposite to pinion screw 114. The amount and direction of the rotation or tilting of platform 112 about the two pinion screws, i. e., about axis $A_1$—$A_1$, is controlled by adjusting bolts 115 and 116 which are positioned in base plate 111 with their tips projecting into engagement with the upper surface of platform 112. For example, clockwise rotation of platform 112 will be caused by retraction of adjusting bolt 115 and a corresponding projection of bolt 116.

Platform 112, together with supporting yoke 117 is rotatable about axis $A_2$—$A_2$, within limits defined by slot 131 which is provided in base plate 111. This rotation takes place about bolt 132 as a pivot, bolt 133 being retracted to reduce the friction between washer 134 and the upper surface of base plate 111 during this rotation and being tightened after the desired adjustment has been attained.

In using the fixture to support crystal 113 during examination by the conoscope described above, the assembly is placed in tank 11 (Fig. 1) in a position similar to that of Fig. 4, quartz crystal 113 being immersed in the fluid and in the path of the light rays and the entire assembly being supported through engagement of the two ends of base plate 111 with respective lip portions provided near the top edge of tank 11. If desired, positioning pins and registry holes may be provided for locating the assembly in the tank. Table 38 and transparent end plate 39 may be removed from the tank during use of the fixture.

The light source, polarizer, lens and analyzer of the conoscope are diagrammatically illustrated in Fig. 4. After the assembly has been properly located in the tank, the two adjustments may then be effected until the desired positioning of the concentric rings (optical) with respect to the cross-hairs of reticule 77 (Fig. 1) indicating that the optical axis of crystal 113 is parallel to the longer axis of base plate 111 has been attained. Platform 112 is then locked in this adjusted position and the entire fixture assembly may be removed from the conoscope, inverted, and positioned in a saw for cutting desired sections from the crystal. It is assumed that suitable positioning members will be provided on the work holder of the saw for proper orientation of base plate 111.

If a natural prism face of crystal 113 is present, the crystal may, if desired, be attached to platform 112 by cementing the prism face thereto. In such event, crystal slabs of a desired orientation may be sawed directly from the crystal after proper adjustments as provided for by the fixture.

Figure 5:
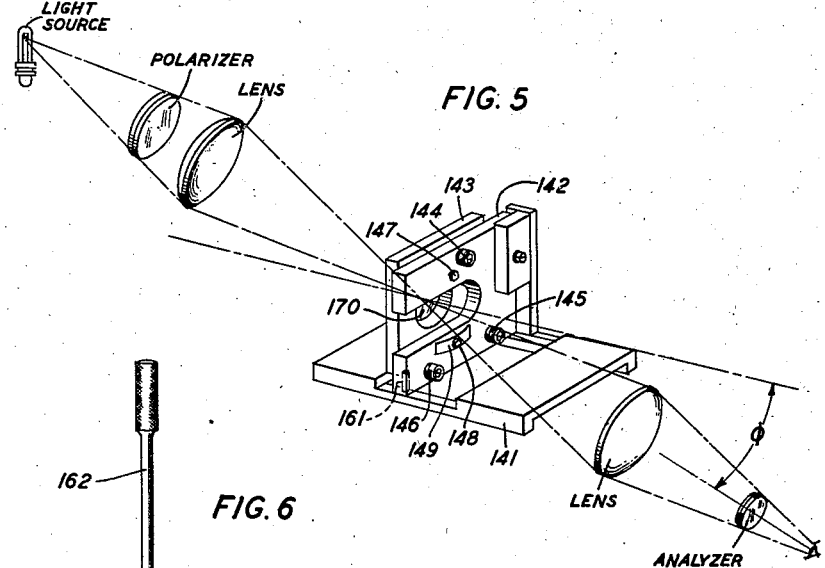
Fig. 5 is a perspective view of another fixture that may be used for adjustably supporting a partially completed crystal plate during examination by the conoscope.

Referring now to Fig. 5, there is illustrated a correction fixture that may be used to advantage in connection with the conoscope, previously described, for "correction" of a partially completed piezoelectric plate or blank in the event that the blank has been cut from the crystal with insufficient accuracy.

The correction fixture illustrated comprises base plate 141 upon which is removably mounted plate 142. A third plate 143 is adjustably supported by plate 142, plate 143 being tiltable within limits with respect to plate 142 by adjustment of bolts 144, 145 and 146. These bolts are positioned in plate 142 with their tips projecting to engage the adjacent face of plate 143. The heads of the bolts are preferably provided with socket heads to facilitate adjustment. Plates 143 and 142 are secured together by bolts 147 and 148, nuts being provided on the bolts which, when tightened, lock plate 143 against plate 142. These bolts pass through oversize holes in plate 142. Before the plates have been locked in adjusted position, spring 149 serves to hold the plates together adjustably. Rotation of plate 143 in its own plane is prevented by engagement of the tip of bolt 144 in a slot provided in the face of plate 143 and by engagement of the tip of bolt 145 in a conical depression provided in the face of plate 143. A centrally located aperture is provided in plate 143, the walls defining the aperture being sloped inwardly. An elongated U-shaped aperture is provided in plate 142.

In use, a partially completed piezoelectric plate or blank 170 is first cemented, or otherwise temporarily attached, to plate 143 centrally located with respect to the tapered end of the aperture provided in plate 143, the blank being so positioned that its "X" or electrical axis is parallel to the length of plate 143. Plate 142, which supports plate 143, is now assembled with base plate 141, being rigidly positioned by registry of pin 161, which is carried by base plate 141, with a properly located hole in plate 142 and by registry of a similar second pin and hole, not shown. The assembly is now placed in the conoscope tank, the under-side of base plate 141 being adapted to fit snugly down onto platform 24 (Fig. 1), after removal therefrom of table 38 and end plate 39 carried thereby. Platform 24 is now set for the desired angle of cut (represented schematically in Fig. 5 as Φ) and if it be found that the interference rings are not properly centered on reticule 77 (Fig. 1), plate 143 may be tilted in the required direction or directions by adjustment of one or more of the three bolts 144, 145 and 146 (Fig. 5) until the interference rings are properly centered. The definition of the aperture through plate 143 by tapered or sloping walls assures that the light from the conoscope light source will not be blocked out by the plate when the fixture has been rotated with platform 24 through the angle of cut. When the proper adjustment of plate 143 has been obtained it is locked in adjusted position against plate 142 by tightening the nuts provided on bolts 147 and 148 and the fixture assembly is removed from the conoscope and placed in suitable grinding apparatus whereby the exposed face of blank 170 is accurately ground parallel with the length of plate 142.

Figure 6:
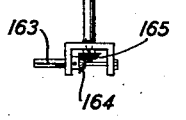
Fig. 6 is an elevational view of a tool that may be used in adjusting the fixture of Fig. 5.

When the correction fixture is positioned on the platform of the conoscope, the entire assembly is ordinarily immersed in the fluid with which the conoscope tank is filled. In order to facilitate adjustment of bolts 144, 145 and 146, while the fixture is immersed in the fluid, a tool of the nature illustrated in Fig. 6 may be used. This tool comprises a driving shaft 162 with knurled finger grip and a driven shaft 163 with a projection properly shaped to register with the socket heads of bolts 144, 145 and 146, the two shafts being mechanically coupled by miter gears 164 and 165.

While certain specific embodiments of the invention have been selected for illustration and detailed description, the invention is not limited in its application to such embodiments. The embodiments described should be taken as illustrative and not restrictive.

What is claimed is:

1. An immersion type conoscope for examining crystals comprising an immersion tank, said tank having two ports at diametrically opposite points in the side wall thereof, an object supporting table within said tank, and two lens systems horizontally arranged with respect to said tank, a concavo-convex lens at one terminal of each of said lens systems, each of said terminal lenses being positioned in a respective one of the ports whereby the ports are effectively closed to the passage of fluids, said terminal lenses being so positioned with respect to each other and their respective inner surfaces being so shaped that they may be considered parts of the same imaginary spherical surface the center of which is within the light path through said lens systems and is so located with respect to said table as to lie within an object supported by said table whereby a ray of light projected from the center point of the imaginary spherical surface to the inner surface of either of said terminal lenses and unrefracted during travel from said center point to said inner surface will strike the respective inner surface at right angles regardless of its direction of projection.

2. An immersion type conoscope for examining crystals comprising an immersion tank, said tank having two ports at diametrically opposite points in the side wall thereof, an object supporting table within said tank, and two lens systems horizontally arranged with respect to said tank, a concavo-convex lens at one terminal of each of said lens systems, each of said terminal lenses being positioned in a respective one of the ports whereby the ports are effectively closed to the passage of fluids, said terminal lenses being mounted on a common horizontal axis and being so positioned with respect to each other and their respective inner surfaces being so shaped that a ray of light projected from a point in said tank which is located on said horizontal axis mid-way between said lenses to the inner surface of either of said terminal lenses and unrefracted during travel from said point to said inner surface will strike said inner surface at right angles thereto regardless of its direction of projection.

3. An immersion type conoscope for examining crystals comprising a plurality of supporting legs, an immersion tank supported on said legs, a rotatable object supporting table within said tank, said tank having two ports at diametrically opposite points in the side wall thereof, a light source, two lens tubes communicating with said tank through the respective ports and being horizontally arranged with respect to said tank, means for polarizing light from said source in one of said lens tubes, a light analyzer in the other of said lens tubes, a hand-wheel for rotating said table located outside of said tank and a shaft operatively connecting said rotatable table and said hand-wheel, said shaft passing through the bottom of said tank whereby the interior of said tank is unobstructed thereby.

4. An immersion type conoscope comprising an immersion tank, an object supporting platform rotatably supported within said tank adjacent to the bottom wall thereof, said tank having two ports at diametrically opposite points in the side wall thereof, a source of light, a first lens tube, one end of said first tube being positioned in one of the ports, said first lens tube extending horizontally with respect to said tank, means in said first lens tube for polarizing light from said source, additional means in said first tube for converging the light after polarization and causing it to enter said tank through said one of the ports in a cone of rays, a second lens tube, one end of said second lens tube being positioned in the other of the ports, said second lens tube also extending horizontally with respect to said tank, means in said second lens tube for analyzing light rays received from said tank, a hand-wheel for rotating said platform located outside of said tank, and a shaft operatively connecting said platform and said hand-wheel, said shaft passing through the bottom wall of said tank whereby the interior of said tank is unobstructed thereby.

5. An immersion type conoscope for examining crystals comprising an immersion tank, said tank having two ports at diametrically opposite points in the side wall thereof, two lens systems horizontally arranged with respect to said tank, a concavo-convex lens at one terminal of each of said lens systems, each of said terminal lenses being positioned in a respective one of the ports whereby the ports are effectively closed to the passage of fluids, said terminal lenses being so positioned with respect to each other and their respective inner surfaces being so shaped that they may be considered parts of the same imaginary spherical surface, and means for adjustably supporting a crystal being examined in said tank, said supporting means comprising a base plate adapted to be supported by portions of the side wall of said tank, a mounting plate adapted to support a crystal adjustably supported by said base plate and means for producing selected amounts of rotation of said mounting plate about two mutually perpendicular axes, the center of the imaginary sphere being within the path of light through said lens systems and being so located with respect to said mounting plate as to lie within a crystal supported thereby whereby a ray of light projected from the center point of the imaginary spherical surface to the inner surface of either of said terminal lenses and unrefracted during travel from said center point to said inner surface will strike the respective inner surface perpendicularly regardless of its direction of projection.

6. In an immersion type conoscope for examining a crystalline material, an immersion tank for containing a fluid or a fluid and a solid, a specimen supporting table within said tank, a plurality of legs for supporting said tank, a light source, an extension arm on one of said legs for supporting said light source in spaced relationship to said tank, said tank having two ports at diametrically opposite points in the side wall thereof, a first lens tube extending horizontally between one of the ports in the tank and said light source, a polarizer in said tube for polarizing light from said source, said polarizer being rotatably mounted in said tube, a plurality of lenses in said tube for converging the light rays after polarization, one of said lenses being positioned in said one of the ports and completely closing it to passage of fluid, a second lens tube extending horizontally from the other port in said tank, a plurality of lenses in said second tube for converging light rays passing therethrough, one of said lenses in said second tube being positioned in said other port and completely closing it to passage of fluid, an eye-piece mounted in the end of said second tube remote from said other port in said tank and a light analyzer positioned in said second tube between said eye-piece and said plurality of converging lenses, said analyzer being rotatably mounted in said second tube.

7. An immersion type conoscope for examining crystalline material comprising an immersion tank for containing a fluid or a fluid and a solid, a rotatable platform within said tank for supporting the material being examined, said tank having a light entry port and a light exit port in the wall thereof, a source of light, a first lens tube positioned between said light source and the light entry port, a second lens tube communicating with the light exit port, a light polarizer in said first lens tube for polarizing light from said light source, means in said first tube for converging the polarized light to form a cone-shaped group of light rays and for projecting the rays through said immersion tank into said second lens tube, a light analyzer in said second tube, means in said second tube for projecting the light rays through said analyzer to a focal point of fixed position, and means for maintaining the position of said focal point constant regardless of changes of the refractive index of a fluid or of a fluid and a solid having corresponding refractive indices in said immersion tank.

8. An immersion type conoscope for examining crystalline material comprising an immersion tank for containing a fluid or a fluid and a solid, a rotatable platform within said tank for supporting the material being examined, said tank having a light entry port and a light exit port in the wall thereof, a source of light, a first lens tube positioned between said light source and the light entry port, a second lens tube communicating with the light exit port, a light polarizer in said first lens tube for polarizing light from said light source, means in said first tube for converging the polarized light to form a cone-shaped group of light rays and for projecting the rays through said immersion tank into said second lens tube, a light analyzer in said second tube, means in said second tube for projecting the light rays through said analyser to a focal point of fixed position, and means for maintaining the position of said focal point constant regardless of changes of the refractive index of a fluid or of a fluid and a solid having corresponding indices in said immersion tank, said last-mentioned means comprising a concavo-convex lens positioned in the light entry port and an identical concavo-convex lens positioned in the light exit port, said two lenses being mounted in face-to-face relationship on a common horizontal axis, the respective inner surfaces of said two lenses being so shaped that light rays projected to either of said inner surfaces in any direction from a point within said tank on said common horizontal axis midway between said lenses and unrefracted during passage from said point to said inner surface will strike said inner surface perpendicularly thereto.

9. In an immersion type conoscope for examining crystals, an immersion tank, a rotatable table within said tank, means outside said tank for rotating said table, means for passing rays of polarized light through said tank, and a crystal supporting fixture adapted to be removably mounted on said table and to be rotatable therewith when so mounted, said fixture including an apertured plate for supporting the crystal being examined in the path of said light rays when said fixture is mounted on said table, cooperating means for adjustably tilting said apertured plate about two mutually perpendicular axes in order to bring the crystal being examined into a particular adjusted position with respect to the path of said light rays, and means for locking said apertured plate in such adjusted position whereby said fixture may be subsequently removed from said table without disturbing the adjusted position of the crystal.

WALTER L. BOND.